Nov. 13, 1928.
W. C. MARTIN
1,691,551
CHANGEABLE EXHIBITOR
Filed May 12, 1922     6 Sheets-Sheet 2
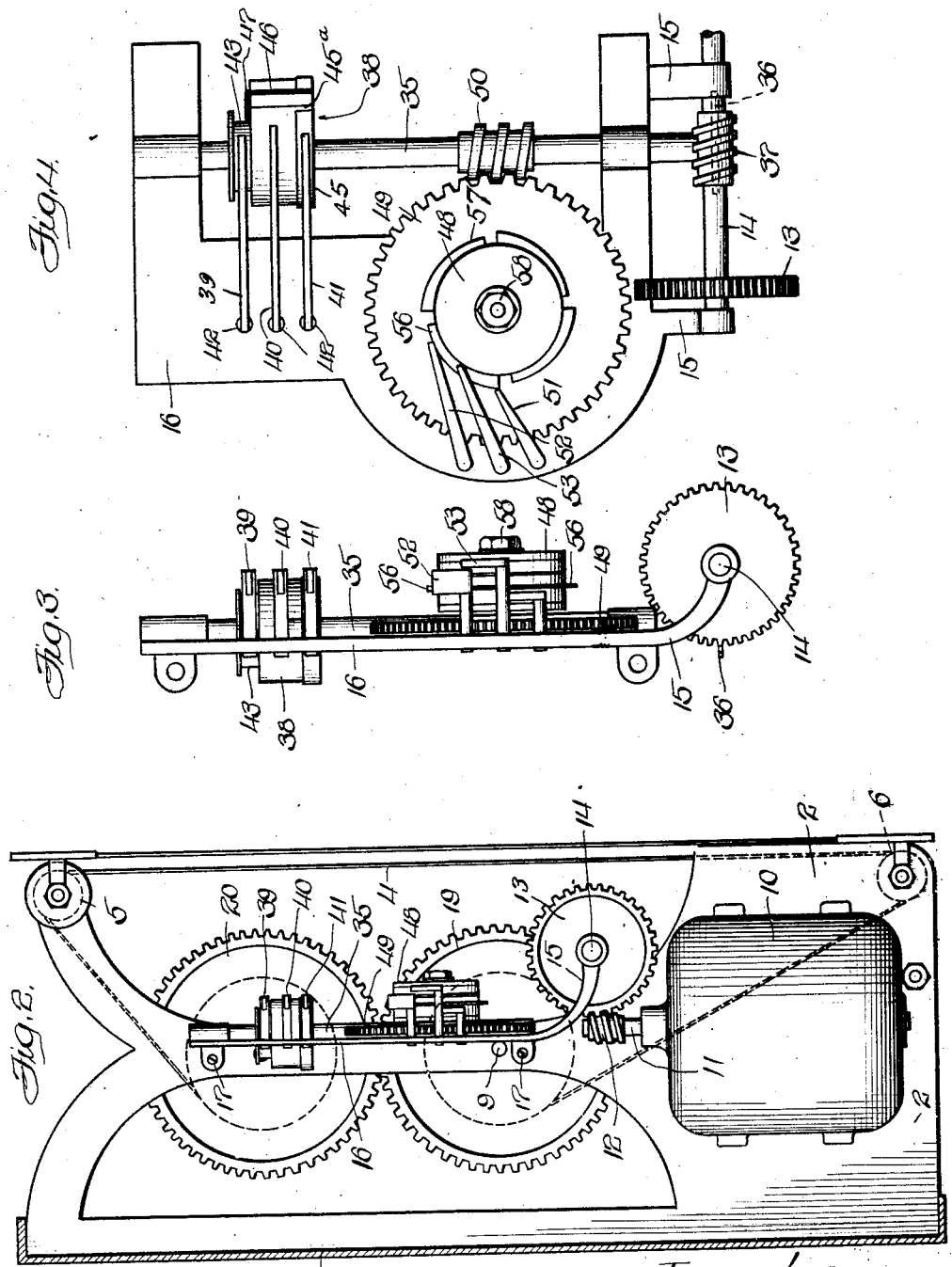
Witness:
W. K. Olson
Inventor:
Welcome C. Martin
By Brendan J. McCarty Atty Nov. 13, 1928.
W. C. MARTIN
1,691,551
CHANGEABLE EXHIBITOR
Filed May 12, 1922
6 Sheets-Sheet 3
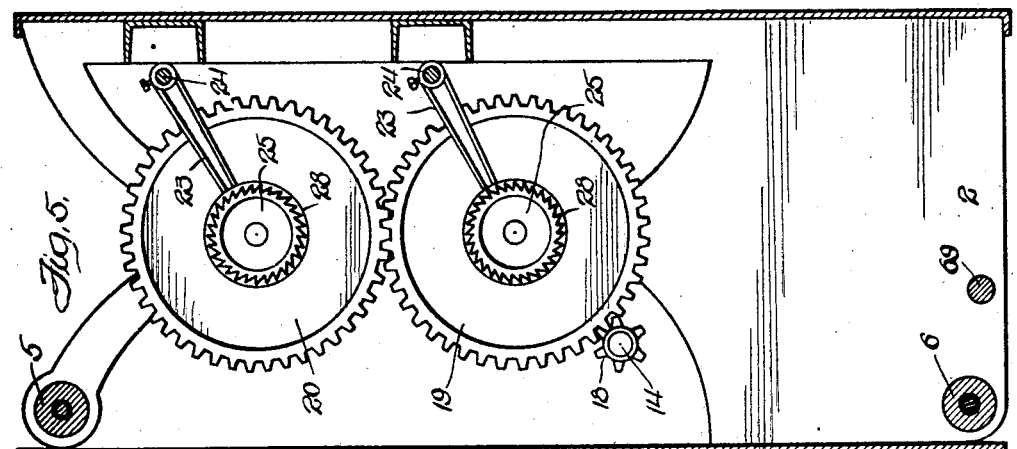
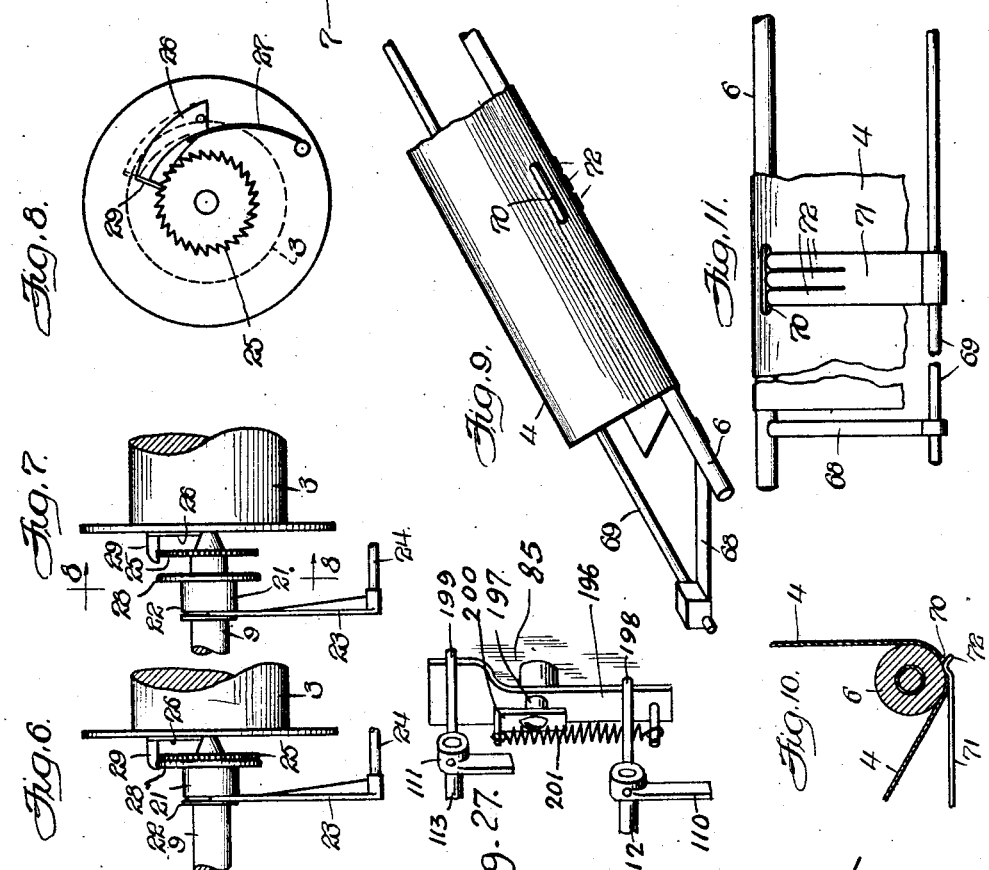

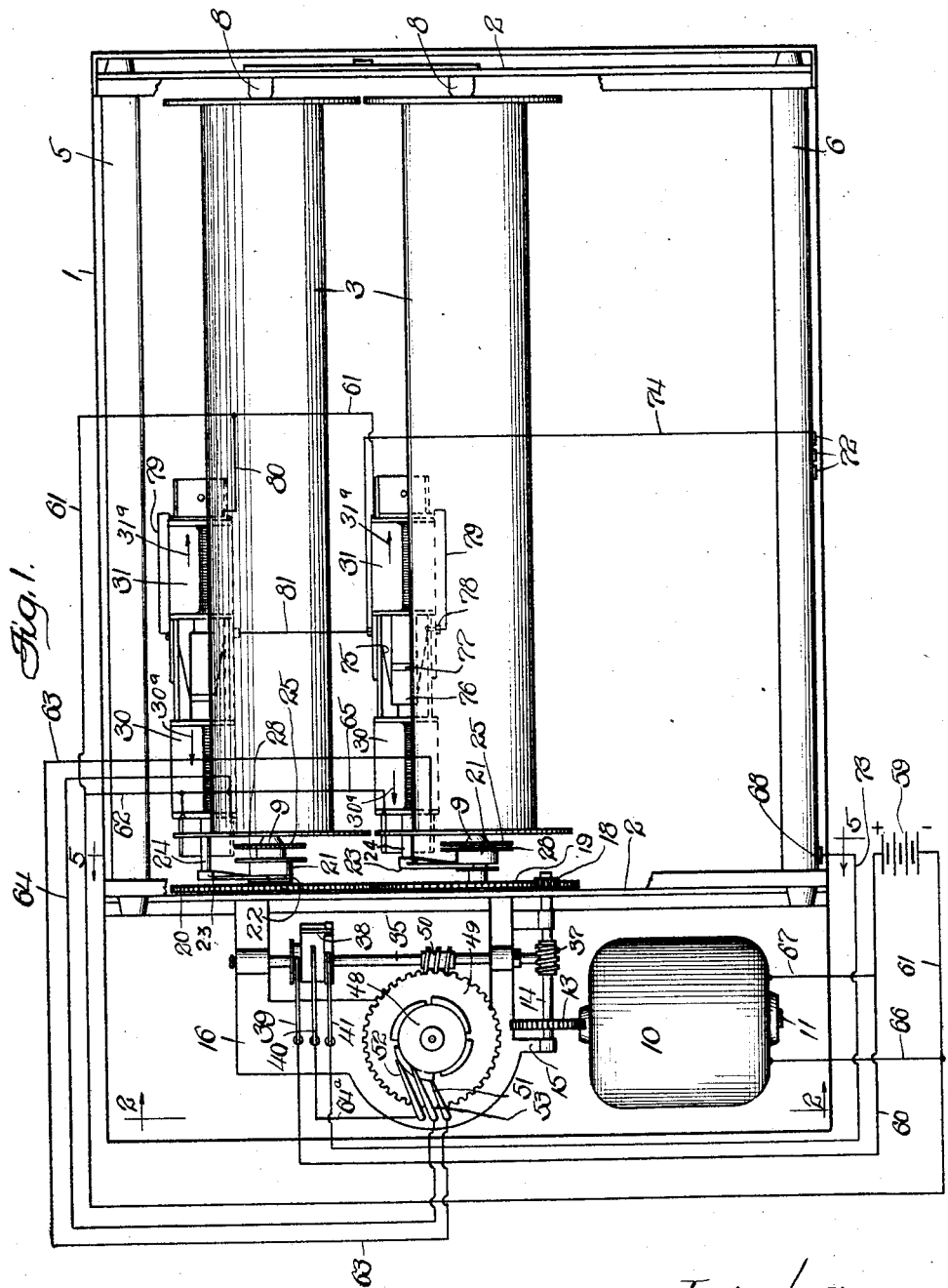

Nov. 13, 1928.
W. C. MARTIN
CHANGEABLE EXHIBITOR
Filed May 12, 1922
1,691,551
6 Sheets-Sheet 4
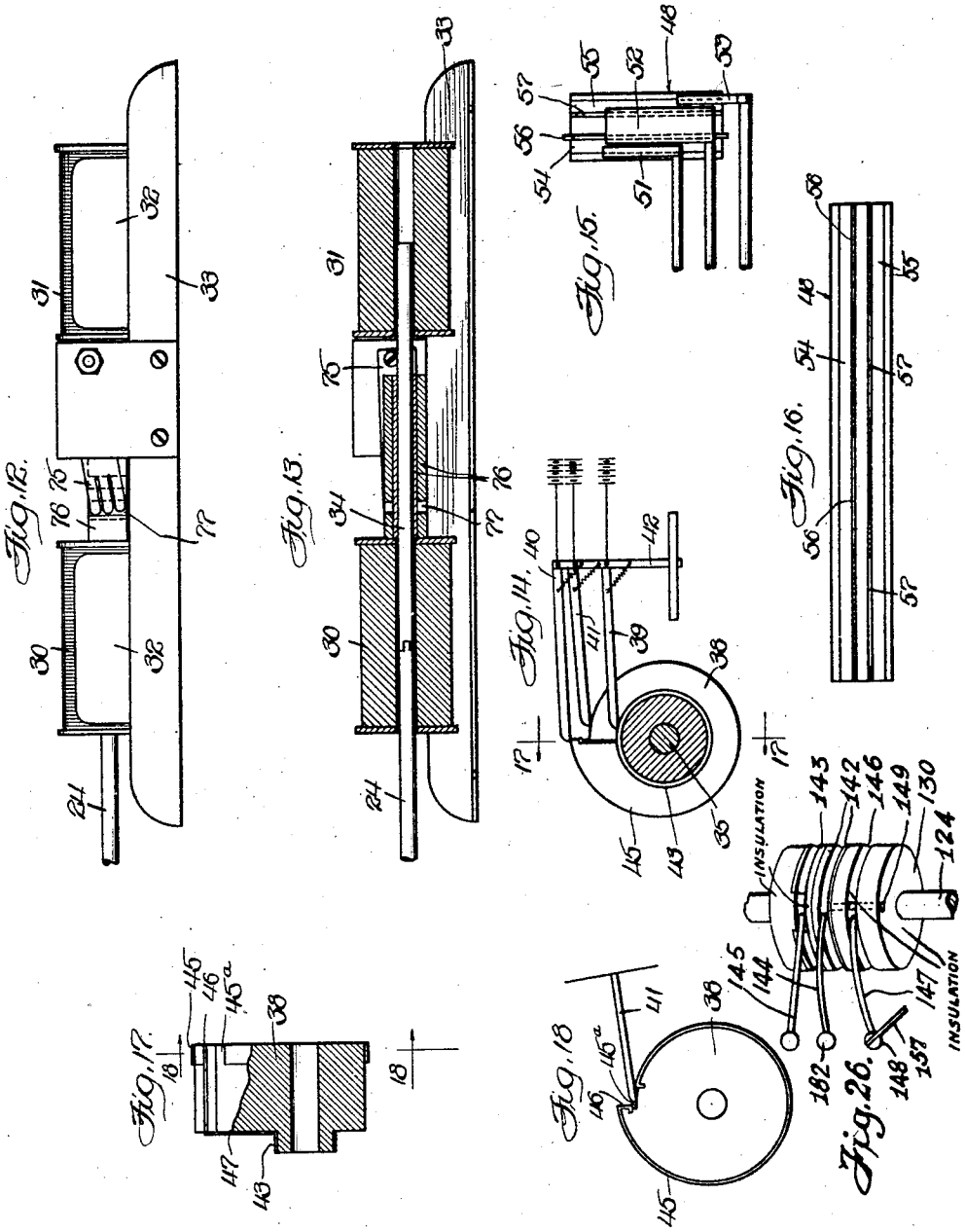

Nov. 13, 1928. 1,691,551
W. C. MARTIN
CHANGEABLE EXHIBITOR
Filed May 12, 1922 6 Sheets-Sheet 5
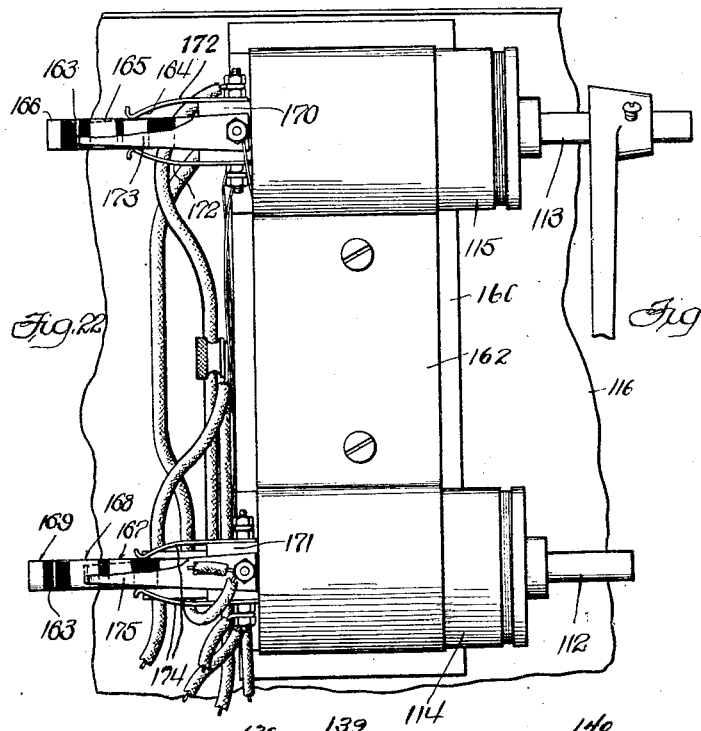
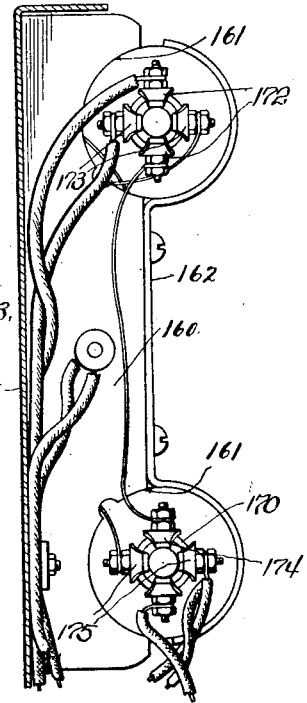
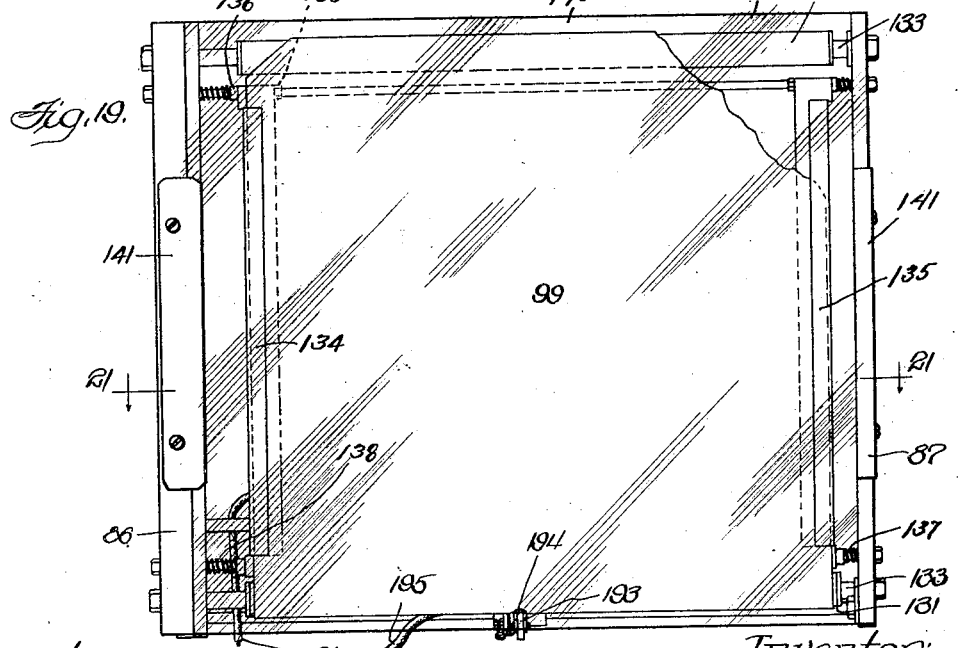

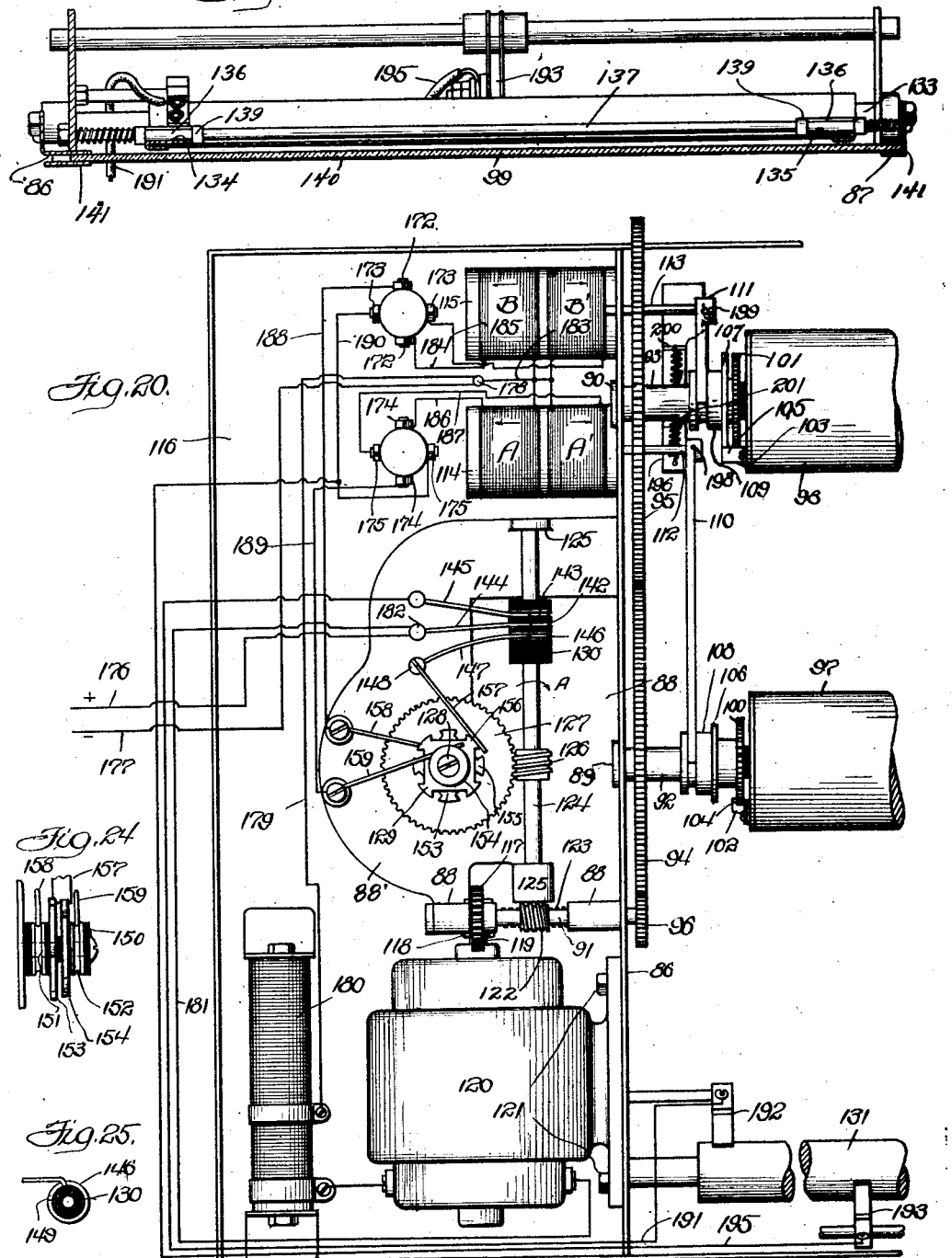

Patented Nov. 13, 1928.

1,691,551

UNITED STATES PATENT OFFICE.

WELCOME C. MARTIN, OF CHICAGO, ILLINOIS.

CHANGEABLE EXHIBITOR.

Application filed May 12, 1922. Serial No. 560,410.

This invention relates to improvements in intermittently operated mechanisms, and more particularly pertains to an improved form of changeable exhibitor employing a flexible web provided with illustrated or printed sections adapted to be successively displayed for advertising and other purposes.

While this invention is here illustrated as embodied in a changeable exhibitor for advertising and similar purposes, it will be obvious that it will not be limited to this adaptation, but finds a wide field of utility for other purposes.

The principal objects and advantages which characterize this invention reside in the provision of improved means for intermittently operating a sectionalized web for exhibiting purposes; the provision of improved means for moving a web for exhibiting and other purposes; the provision of improved means for intermittently feeding a web and for reversing the direction of movement of same; the provision of improved means for intermittently exhibiting a series of illustrations or printed matter on a continuous flexible web; and the provision of improved means for intermittently feeding a printed or illustrated web and for reversing the web at the proper time.

This invention further and more specifically relates to an electrically actuated, changeable exhibitor having a web wound from one reel to another and reversed automatically for bringing the advertising or other sections thereof successively into view at a display opening or window in the casing in which the parts are contained.

Among the more specific objects of my invention are, first, to improve the construction of devices of the kind mentioned; second, to provide an improved form of switch mechanism for stopping the web at predetermined intervals to properly display the sections thereof, and, third, to provide a slower rotating switch for automatically reversing the direction of the web at predetermined points in its length, such switch having sections in the reverse order so constructed that the web may be reversed at any desired point in its length, say after a certain number of sections have been displayed.

Other and further objects of my invention will appear from the following description, taken in connection with the accompanying drawings, in which—

Figure 1 is a front view of a changeable exhibitor constructed in accordance with my invention, the outer casing being omitted;

Fig. 2 is a vertical sectional view taken on line 2—2 of Fig. 1;

Figs. 3 and 4 are side and front views, respectively, of a detail of construction to be hereinafter described;

Fig. 5 is a vertical sectional view taken on line 5—5 of Fig. 1;

Figs. 6 and 7 are side views of the electrically actuated clutch mechanism for one of the reels, the clutch being shown moved into position to disconnect the reel from its live spindle in Fig. 6, and in position connecting said parts in Fig. 7;

Fig. 8 is a sectional view taken on line 8—8 of Fig. 7;

Figs. 9, 10 and 11 are perspective, sectional and bottom plan views, respectively, showing the contact fingers associated with the movable web;

Figs. 12 and 13 are side elevational and longitudinal sectional views, respectively, of one of the sets of solenoids for operating the clutch mechanism;

Fig. 14 is a view of the rotating switch of the stopping mechanism;

Fig. 15 is a top plan view of the rotating switch of the reversing mechanism;

Fig. 16 is a developed view of the said reversing switch;

Figs. 17 and 18 are sectional views, the former taken on line 17—17 of Fig. 14, and the latter on line 18—18 of Fig. 17;

Fig. 19 is a front view of a modified form of this invention;

Fig. 20 is an enlarged plan view of the actuating mechanism of said modified form;

Fig. 21 is an enlarged transverse sectional view taken on line 21—21 of Fig. 19;

Figs. 22 and 23 are enlarged plan and end views, respectively, of the electro-magnets shown in Fig. 20.

Figs. 24 and 25 are detail views of the switch elements shown in Fig. 20, and

Fig. 26 shows in perspective view to an enlarged scale, the construction of the rotating switch of the stopping mechanism shown in Figs. 20 and 25.

Fig. 27 shows in perspective view, interacting devices between the clutch operating mechanisms shown in Fig. 20.

The driving mechanism shown in Figs. 1 and 2, includes an electric motor 10 having on its armature shaft 11, a worm 12 in mesh with a worm gear 13 fixed on a shaft 14 journaled in hangers, 15, 15, on a plate 16 secured to one of the brackets 2 by screws 17, as shown. The shaft 14 extends inside of the bracket 2 toward the lower reel 3 and has fixed thereto a gear pinion 18 in mesh with a gear wheel 19 fixed on the live spindle 9 of the lower reel 3. The gear wheel 19 meshes with a gear wheel 20 of the same diameter fixed on the live spindle 9 of the upper reel 3, and when the motor 10 is rotated the gear wheels 19, 20, and live spindles are turned in opposite directions, so that when either reel is clutched to its spindle it will be the winding reel.

The clutch mechanism for each reel consists of a sleeve 21 loosely and slidably mounted on the associated live spindle 9 and having a groove 22 engaged by the forked end of a yoke 23 secured to a shift rod 24. Fixed to the spindle 9 is a ratchet wheel 25 engaged by a pawl 26 pivoted on the end of the reel 3, as shown in Fig. 8. A spring 27, carried by the reel 3, acts to force the pawl into engagement with the ratchet wheel 25 for connecting the reel and spindle 9. To raise the pawl 26 out of engagement with the ratchet wheel 25 to disconnect the reel from its spindle 9, the sleeve 21 is provided with a radial flange 28, which when moved under the end 29 of the pawl raises and holds it out of engagement with said ratchet wheel.

For operating each clutch device are two alined solenoids 30, 31, as shown in Figs. 1, 12 and 13. These solenoids are held in place by clips 32 on a base plate 33 secured to the back 1 as shown. The core or armature 34 is in the form of a rod, as shown in Figure 13, and is connected at one end with the shift rod 24. When one solenoid is energized the other is deenergized, and when the one 31 is energized the rod 34 is moved in direction of arrow 31$^a$ to operate the clutch and disconnect the reel from its spindle 9. When the other solenoid 30 is energized, the rod 34 is moved in the opposite direction, arrows 30$^a$, and connects the reel with its spindle 9. This is done automatically at predetermined intervals for stopping the web after a display section has been brought to view at the window and allow the web to remain stationary for a length of time to display such section.

Journaled in the plate 16 is a vertical shaft 35 having at its lower end a worm wheel 36 in mesh with a worm 37 on the shaft 14, as shown in Figs. 1, 3 and 4. Fixed on this shaft 35 adjacent its upper end is a rotary switch member 38, made of insulating material and upon which bear a plurality of spring controlled contact fingers or brushes 39, 40 and 41, each pivoted on a binding post 42 secured to the plate 16. The switch member 38 has an annular commutator ring 43, against which the finger 39 bears, while the finger 40 bears against the surface of said member 38. This surface is raised at one point in its circumference and thus makes the member somewhat cam-shaped, as shown in Figs. 14 and 18. The finger 41 bears against a ring 45 interrupted at the cam projection, as shown in Fig. 18. This provides a gap 45$^a$ bridged by the insulating material of which the member 38 is made and breaks the circuit through finger 41, in the manner to be presently described. At this cam projection there is a bar 46 set in the member and in contact with the edge of the ring 45, as shown in Figs. 4, 14, 17 and 18. This bar is connected with the outer ring 43 by a conductor strip 47.

To reverse the direction of the web 4, I provide another rotary switch member 48 of insulating material, secured to a gear wheel 49 in mesh with a worm 50 on the shaft 35, as shown in Figs. 1 and 4. Pivoted on the plate 16 is a plurality of spring controlled contact fingers or brushes 51, 52 and 53, the first and last ones bearing on annular commutator rings 54, 55, carried by said switch member. The middle brush 52 is adapted to engage, one at a time, outwardly projecting contact segments or blades 56, 57, arranged in sets with one set laterally spaced apart from the other set, as shown in Figs. 15 and 16; the segments of each set have the same peripheral length, are also spaced apart circumferentially or endwise a distance slightly greater than the length of a blade, so that there is a blade of one set opposite the space between blades in the other set, as shown in Fig. 16. Thus the brush 52, while being wide enough to be in the path of movement of both sets of blades, will only contact with one at a time, one moving out of contact just before the following one of the other set moves in. The segments 56 of one set engage the ring 54, while the segments 57 of the other engage the ring 55, there being a portion of the member 48 between the two sets to insulate them from each other. The path of the current, when the middle brush 52 is in contact with one segment, is through such parts and the associated ring and not through the other ring and its segments; thus when the finger 52 is in contact with one of the segments 56, the web will be moved in one direction, but when in contact with one of the other segments 57 the web will move in the opposite direction. The peripheral length of the segment 56 is proportionate to the length of the web or the number of successive sections into which the web is divided, and the rate of rotation of the switch member 48 is slower than the other switch member 38 and is such that the brush 52 stays in contact with one segment or blade until all of the display sections for that segment have been successively brought to view at the window 7. When that happens, the segment 56 moves out of contact with the brush 52, and the following segment 57 moves under and into contact with the brush 52, thus reversing the web, and allowing the web to run in the opposite direction to the same extent before being reversed again. This cycle of operations repeats as long as the motor is rotated and the web reversed after a display of its sections. This reversing mechanism may be set to reverse the web at any predetermined point in its length, that is, if the full length of the web is divided into a given number of display sections, the web may be reversed at the end of the display of all of those sections, by putting on a switch member 48 having segments of the length to accomplish this, this member 48 being clamped to the gear wheel 49 by a nut or like part 58 (Fig. 4). Should it be desired to exhibit a lesser number of those sections, the first mentioned member 48 would be replaced by one with segments or blades having a peripheral length for that purpose.

Current is supplied by a generator or a battery 59, as shown in Fig. 1, and from which leads a wire 60 connected to the brush 39. The other wire 61 leads to magnet 31 of the lower reel 3. A wire 62 connects wire 61 with the magnet 30 of the upper reel. A wire 63 leads from the magnet 30 of the lower reel to the finger 51. A wire 64 connects the finger 53 with the magnet 30 of the upper reel. A wire 65 connects the magnet 30 of the lower reel with wire 62. The motor 10 is connected to the wires 60 and 61 by wires 67 and 66, respectively.

Bearing against the lower guide roller 6 is a contact finger 68 mounted as shown in Figs. 9 and 11 on a cross-bar 69 which extends between the brackets 2, 2. This finger 68 is constantly in contact with the roller 6, this being live as it is in the circuit of the device. The finger 68 bears against that portion of the roller beyond one of the side edges of the web 4, as shown in Figs. 1, 9 and 11. The web 4 is divided lengthwise into a plurality of advertising or display sections, preferably of uniform height, and between the sections are transversely arranged, elongated apertures or slots 70, as shown in Figs. 9, 10 and 11. These slots are arranged centrally of the web and cooperating with them is a contact finger 71 on and insulated from the rod 69. The free end of the finger 71 is split to provide a plurality of resilient tongues 72 adapted to engage the roller 6 through the apertures 70 when the parts register for that purpose. By providing the tongues 72 there is a certainty of having contact made even though the web may shift laterally and cause the slots 70 to move partially out of alinement with the finger 71. The contact finger 68 is connected by a wire 73 with the finger 41, while the contact finger 71 is connected by a wire 74 with a brush 75 of the magnets for the lower reel, as shown in Fig. 1. As shown in Fig. 13, the armature rod 34 of each set of magnets is surrounded by a sleeve 76 of insulating material having between its ends a contact ring 77 for the corresponding brushes 75. To the terminal 78 (Fig. 1) of the other brush 75 of the lower magnets is connected a wire 79, which leads to one of the terminals of the lower magnet 31 of the set. A similar wire 79 connects the upper one of the upper brushes 75 with one terminal of the upper magnet 31. The other terminal of the upper magnet 31 is connected by a wire 80 to the wire 61. The brushes 75 of the two sets of magnets, not connected with wires 79, are connected by a wire 81.

When the parts are in the position shown in Fig. 1, the upper reel 3 is clutched to the gear wheel 20, and the motor 10 on being rotated winds the web 4 on the upper reel, the lower reel being disconnected from the gear wheel 19 and being loose to turn as the web unwinds therefrom. The solenoid 30 of the lower reel is maintained deenergized through the rotary switch mechanism 48 to leave the lower reel unclutched from the gear wheel 19 during the entire time that web is wound on the upper reel. When a display section is brought into view at the window 7, the web is stopped by being disconnected from the gear wheel 20. This happens by the finger 71 engaging the roller 6 through the slot 70, and, completing the circuit through wires 74 and 81, energizing the solenoid 31 of the upper reel and operating the clutch to disconnect that reel from the continuously rotating gear wheel 20. This moves the ring 77 (Fig. 13) out of contact with the upper brushes 75 and breaks the circuit through the upper solenoid 31 to deenergize it. The web 4 remains stationary until the finger 40 drops over the cam projection of the member 38. The finger 40 in dropping wipes past and momentarily contacts with the bar 46, which, being connected with the ring 43, completes the circuit through the fingers 39 and 40 and causes a flow of current through the wire 64ª, finger 52, segment 57, ring 55, finger 53, wire 64, and to the upper solenoid 30, energizing it and clutching the upper wheel to the gear train. At about the same time, the finger 41 has dropped over this cam projection and is in contact with the insulating portion 45ª in the gap in the ring 45, thus breaking the circuit through the roller 6, so that this circuit will be broken when the brushes 75 and contact ring 77 of the upper set of solenoids are brought again in contact and thus preventing reenergizing of the upper solenoid 31 and prematurely again disconnecting the upper reel. The finger 41 rests on the insulating portion 45ª until the web 4 has advanced sufficiently to separate the finger 71 from the roller 6. Then the finger 41 moves off of the insulating surface 45ª on to the ring 45 to complete the circuit through the roller 6, when the next slot in the web registers with the contact finger 71. This cycle of events repeats each time a display section is brought opposite the window 7 and the web is thus stopped intermittently for the purpose stated. When the web has been wound on the upper reel to the full extent desired the switch member 48 has been rotated sufficiently to cause the segment 57 which was in contact with the fingers 52 to move out of contact therewith and to establish contact between the finger 52 and the next segment 56, alternately energizing the lower solenoids 30 and 31 through the wires 63 and 74 in the manner above described, to clutch and unclutch the lower reel to and from the gear train, at the intervals noted, to wind the web on that reel, and display the sections over again, but in the reverse order, the gear train and the direction of movement of the web being reversed.

It will be observed that the switch member 48 serves to selectively connect the wires 63 and 64 with the finger 40; that with the wire 64 so connected, the upper solenoid 30 is energized each time the finger 40 wipes across the bar 46; that with the wire 63 so connected, the lower solenoid 30 is energized each time the finger 40 wipes across the bar 46; that each operation of a solenoid 30 moves the corresponding ring 77 between a pair of brushes 75 to in part close at that point, the energizing circuit through the corresponding solenoid 31; that the solenoids 31 are connected in parallel relation with the source of current and the finger 71, so that the particular solenoid 31 energized by contact between the finger 71 and the roller 6, is determined by which ring 77 happens at that time to be between and in contact with its brushes 75; also that each solenoid 30 is energized but momentarily by the wiping contact of the finger 40 across the bar 46, that each solenoid 31 is but momentarily energized due to movement of its ring 77 immediately breaking its energizing circuit, and that, notwithstanding the momentary energization of the solenoids 30, the gap 45ª above described, insures that after any energization of one of the solenoids 30, initiating a movement of the web 4, the corresponding solenoid 31 cannot be energized until said movement has been continued a desired amount, representing for intermittent display purposes, a single display.

With reference to Figures 19 to 23 inclusive it will be observed that certain elements of the invention, hereinbefore described, are modified. Referring to Figs. 19 and 20, there is provided a base 85 which is provided with side frames 86 and 87, said frame 86 being provided with bearings 89 and 90, said bearings 89 and 90 supporting rotatable live shafts 92 and 93, said latter shafts having gears 94 and 95 fixedly mounted thereon, respectively, said gears being in mesh. One of said gears, namely 94, is operatively in mesh with a pinion 96, which latter is fixedly secured to the inner end of the shaft 91, said shaft 91 being mounted in bearings 88 on a plate 88'. The inner ends of the shafts 92 and 93 are tapered and seated in recesses provided in the adjacent ends of the feed rollers 97 and 98 respectively, over which rollers is trained the flexible web 99, the ends of the web being secured in any desired manner to the rollers. The opposite ends of the rollers are mounted in bearing elements similar to the members 8—8 previously described. Thus the rollers are freely rotatable in the desired directions as will presently appear.

As best seen in Fig. 20, each of shafts 92 and 93 has a ratchet wheel 100 and 101, respectively, fixed to the shafts and in proximity to the inner tapered ends of the shaft, the teeth of said wheels being opposite. The rollers 97 and 98 are provided with spring pressed pawls 102 and 103, respectively, said pawls having fingers 104 and 105 for engagement with the annular flanges 106 and 107 provided on clutch members 108 and 109 respectively. The clutch members are mounted freely and slidably on the shafts 92 and 93 and are actuated at the proper instant for releasing or engaging one or the other of the pawls 102 and 103.

The actuating mechanism for the clutch members comprises the arms 110 and 111, secured fixedly to the inner ends of the rods 112 and 113, respectively, which latter pass each through one of the solenoids 114 and 115, constructed as will presently be described. The free ends of the arms 110 and 111 lie in annular grooves in said clutch members 108 and 109 respectively. For the sake of convenience the solenoids are mounted on an extension 116 of the base 85 and are each provided with double windings, designated A—A' and B—B', respectively.

The shaft 91 has a worm gear 117 fixedly secured thereto and meshing with a worm 118 fixedly secured to the armature shaft 119 of the electric motor 120, which latter is secured to the side frame 86 by bolts 121 or the like. The shaft 91 is also provided with a worm 122 fixed to the medial portion of said shaft, said worm meshing with a worm gear 123 fixedly secured to one end of the timer switch shaft 124, which latter shaft is longitudinally arranged and rotatably mounted in bearings 125—125 on the plate 88'. Near the medial portion of the shaft 124 there is fixedly mounted thereon a worm 126, which latter operatively meshes with a worm gear 127, said gear being rotatively mounted on a stud 128 which projects from the plate 88', said gear 127 operating the reversing switch, generally designated 129. Also fixedly mounted upon the shaft 124, is a switch drum 130, preferably of insulating material. The switch 129 regulates the time of reversal of the drums or rollers which feed the web and the drum 130, with its connections, controls the intermittent feeding of the web, that is, it controls the energization of the windings A and B of the electro-magnets or solenoids, 114 and 115.

The feed rollers 97 and 98 are relatively close together, the web being trained over idling rollers 131 and 132 mounted on rods 133 near the ends of and extending between the frames 86 and 87, the portion of the web 99 between the rollers 131—132 being the exposed portion. This exposed portion of the web is guided by the yieldingly mounted channels 134 and 135, said channels being fixed to tubes 136—136, said tubes being slidably mounted upon transversely arranged rods 137—137, which latter are mounted in the side frames 86 and 87. Helical springs 138—138 surround the rods 137 and abut the tubes, the tubes in turn being limited in movement away from the side frames by collars 139 mounted on said rods. A glass plate 140 is arranged above the web in demountable channels 141—141, secured to the frame 86 and 87.

The switch drum 130 is provided with two grooved rings 142 and 143, in which the ends of resilient contact arms 144 and 145 seat, said arms being fixedly mounted in insulated binding posts on the plate 88'. The drum 130 itself is provided with a groove 146 in which one end of the resilient contact arm 147 seats, said arm being fixedly mounted on the plate 88' in an insulated binding post 148. At a proper point in the groove 146 is provided a metallic pin 149, connected to the ring 142, (Fig. 25). The ring 143 extends but part way around the drum. The rings 142 and 143 are mounted on the drum 130, so they touch each other and are thus electrically connected, the construction of the drum 130 and the parts carried thereby, being more clearly shown in Fig. 26. The rings 142 and 143 and the pin 149 correspond respectively to the rings 43 and 45 and the bar 46 above described in connection with the switch member 38, the relation of the parts to the fingers and arms bearing thereon, being substantially the same in each case and for the same purpose, the principal difference being that contact between the contact arm 147 and the pin 146 is not momentary as above described for contact between the finger 40 and the bar 46, other means being provided as described below, for at once opening the circuit so closed by the arm 147.

The reversing switch 129, comprises a core 150 of insulating material, fixedly secured to the worm gear 127 and supporting a pair of spaced grooved metallic disks or rings 151 and 152, (Fig. 24) said rings being, respectively, connected with the spaced insulated timing disks 153 and 154. The disks 153 and 154 are provided each with radial contact heads 155 and 156, respectively arranged so that the heads are relatively alternately disposed as seen in Fig. 20. A resilient contact finger 157 is in the path of movement of the heads 155 and 156 and is fixedly secured to the binding post 148. Resilient contact fingers 158 and 159 are mounted on insulated binding posts on the plate 88', said fingers lying in the grooved rings 151 and 152, respectively.

As best shown in Figs. 22 and 23, the solenoids 114 and 115 are secured to the base portion 116, a block 160 provided with sockets 161—161 serving to seat said solenoids, and a clamp 162, secured to the block 160 engages said solenoids and prevents their displacement.

The rods 112 and 113, which are in part the movable cores of the solenoids, are extended through the solenoids and their projecting ends serve as circuit controlling means. To this end the rods are provided with non-metallic insulating portions 163, in which are supported metallic rings 164, 165, 166, 167, 168 and 169. The rods pass through insulating blocks 170 and 171, and pairs of spring fingers 172—173, and 174—175, respectively, are supported by said blocks and project therefrom for contact with said metallic rings. The fingers 172 and 174 are relatively shorter than those designated 173 and 175 for a purpose which will presently appear.

Of the rings 164, 165 and 166 carried by the insulation 163 on the rod 113, the rings 164 and 165 are contact rings, the ring 166 being employed solely to hold the assembly of contact rings in place; similarly, of the rings 167, 168 and 169, only the rings 167 and 168 are contact rings and the ring 169 serves solely as a retaining ring.

The mechanical construction is such, that when the rod 113 is in its extreme right hand position, as shown in Fig. 22, the ring 164 is between and electrically connects springs 172, and the ring 165 is between the springs 172 and 173 and is not in contact with any of said springs, the springs 173 being then resting upon and separated by the insulation 163; also, that when the rod 113 is in its extreme left hand position, the ring 165 is between and connects the springs 173, the ring 164 is between the two pair of springs and not in contact with any of them, the springs 172 at that time resting upon and being separated by the insulation 163. Similarly, the rod 112 in its left hand position connects the springs 175 by the ring 168, and in its right hand position connects the springs 174 by the ring 167, and for either of said positions, the said springs not so connected, rest upon the insulation carried by the rod and are electrically separated thereby.

As best seen in Figure 20, current is supplied by the conductors 176—177, the latter extending to a binding post 178, whence a conductor 179 leads, through a resistance coil 180, to one side of the electric motor 120, thence a conductor 181 leads from the other side of the motor to a binding post 182, which latter carries the spring finger 144 and is connected to the conductor 176. Thus the motor circuit is completed.

Each of the solenoid windings is connected by a common conductor 183 to the binding post 178, the other sides of said windings being connected by conductors 184, 185, 186 and 187 respectively to one of each pair of the resilient contact fingers 172, 173, 174 and 175. The other fingers 172 and 174, are connected respectively by conductors 188 and 189, to the spring arms 158 and 159, and the other fingers 173 and 175, are connected together by a conductor 190. The spring finger 145 is connected by a conductor 191 to an insulated brush 192, which is adapted to contact continuously with the guide roller 131, an insulated pivoted arm 193 being arranged to intermittently contact with said roller 131 through one each of a series of spaced openings 194 in the web, as the same passes over the guide rollers. A conductor 195 connects the arm 193 to the conductor 190.

In operation, assuming the parts to be as shown in Fig. 20, and current is supplied to the conductors 176—177, the timer shaft is rotated in the direction of the arrow A, the motor continuously operating. In the position of the parts as shown, the clutch element 108 is out, that is, the pawl 102 is engaging the ratchet 100 and the roller 97 is being operated. When the opening 194 between sections of the web permits the arm 193 to contact with the roller 131, current flows from the binding post 182 through arm 144 and ring 142 to ring 143, spring arm 145, conductor 191, arm 192, roller 131, arm 193, conductor 195 to conductor 190, thence through ring 168 on rod 112 to winding A' thus moving clutch member 108 to raise pawl 102 and release roller 97, thus stopping the web. This movement of the rod 112, moves the ring 168 from contact with the springs 175 and brings the insulation 163 between them, thus deenergizing the winding A', and at the same time brings the ring 167 between and in contact with the springs 174 to close the circuit of the winding A at this point and place it in condition for complete closure by the switch member 130. After a desired interval of rest of the web 99, or display interval, during which the shaft 124 and the switch member 130 are continuously in motion, the pin 149 engages arm 147, and current flows through conductor arm 157, disk 154, arm 159, conductor 189, springs 174 and ring 167 to winding A, thereby withdrawing clutch 108 and permitting roller 97 to be again rotated. When the web, by a series of steps, reaches one end of its run, the disk 154 has been rotated to bring the tooth 156 thereof clear of the arm 157, the latter being immediately thereafter engaged by one of the teeth 155 of the disk 153. When this occurs, and it is timed to take place while the web is stationary, the pin 149 causes current to flow through arm 147, arms 157, 158, and conductor 188, springs 172, ring 164 to winding B. The rod 113 is in the position shown in Fig. 22 when the reversal takes place, and upon energization of the winding B said rod is moved to release pawl 103 to engage ratchet 101 starting roller 98. Said movement of the rod 113 actuates rod 112 to move pawl 102 out of engagement with its ratchet 100 by means of a lever 196 pivoted at 197 to the base 85, said lever engaging pins 198—199 extending from the hubs of the arms 110 and 111, respectively as shown in Fig. 27. A bracket 200 is fixed to the pivot 197 and a coiled spring 201 is connected to said bracket and the lever 196 tending to hold said lever in either position to which it is moved. The operation continues as previously described until the web reaches the end of its travel whereupon it is again reversed.

From the above description it will appear that the operation and result of the construction shown in Figs. 19 to 27, is much the same as for the construction shown in Figs. 1 to 18, the principal differences being, first, that with the construction of Figs. 19 to 27, each solenoid winding has included in its energizing circuit a contact ring carried by the rod moved by the action of said winding, and contact springs engaging said ring, thus insuring that each winding shall be energized for a sufficient interval to effect movement of its rod, and further insuring the breaking of the energizing circuit in each case, as a result of the action of the winding; and second, that movement of either clutch rod to cause the corresponding web roller to be driven, moves the other clutch rod to disengage the other web roller, in the event said other clutch rod happens to be in its roller driving position.

While I have shown and described in detail herein a device embodying the features of my invention, it is to be of course understood that the details of construction and arrangement of parts may be variously changed and modified without departing from the spirit and scope of my invention.

I claim as my invention:

1. In a device of the character described, the combination of two reels, a web carried thereby, a live spindle for each reel, electrically actuated clutch means for each reel for connecting and disconnecting the same to and from its spindle, a motor, a gear train connecting the motor with said spindles for rotating the latter in opposite directions, means in circuit with said clutch means and controlled by the movement of the web for making and breaking the circuit through the clutch means of the winding reel, and rotary switch mechanism driven by the gear train and in said circuit and having segmental contact members of peripheral lengths proportionate to the length of the web for reversing the action of said clutch means to change the direction of the movement of the web at predetermined points in its length.

2. In a device of the class described, the combination of two reels, a web carried thereby, a live spindle for each reel, electrically actuated clutch means for each reel for connecting and disconnecting the same to and from its spindle, a motor, a gear train connecting the motor with said spindles for rotating the latter in opposite directions, means in circuit with said clutch means and controlled by the movement of the web for making and breaking the circuit through the clutch means of the winding reel, and rotary switch mechanism driven by the gear train and in said circuit and having segmental contact members of peripheral lengths proportionate to the length of the web for reversing the action of said clutch means to change the direction of the movement of the web at predetermined points in its length, said switch mechanism including an annular member removably connected with one of the gear wheels in said gear train so that said member may be removed therefrom and be replaced by another having segmental contacts of a different length to change the direction of movement of the web at a different point in its length.

3. In a device of the character described, the combination of two reels, a web carried thereby, a live spindle for each reel, electrically actuated clutch means for each reel for connecting and disconnecting the same to and from its spindle, a motor, a gear train connecting the motor with said spindles for rotating the latter in opposite directions, means in circuit with said clutch means and controlled by the movement of the web for making and breaking the circuit through the clutch means of the winding reel, and rotary switch mechanism driven by the gear train and in said circuit for reversing the action of said clutch means to change the direction of movement of the web at predetermined points in its length, said switch mechanism comprising an annular member of insulting material connected with one of the gear wheels in the gear train, two commutator rings carried by said member and insulated from each other, two sets of segmental contact blades fixed to said member and projecting radially outward therefrom, with the blades of each set having the same peripheral length and spaced apart endwise a distance slightly greater than the length of a blade, said sets of blades being laterally spaced apart and insulated from each other by said member and arranged with the blades of one set opposite the spaces between the blades of the other set and electrically connected with associated rings, and three contact fingers, one for each ring and bearing constantly against the same, and the third finger being wide enough to extend into the path of movement of the blades and to bear against only one blade at a time.

4. In a device of the character described, the combination of two reels, a web carried thereby, a live spindle loosely engaged with one reel, a motor, a gear train connecting said spindle with said motor for turning said spindle in one direction, a clutch mechanism between said spindle and its associated reel for connecting and disconnecting said reel to and from said spindle, a pair of solenoids having a common armature connected with said clutch mechanism for operating the same, and a make and break mechanism in circuit with said solenoids to alternately energize the same, including a rotary switch driven by the gear train comprising an annular member of insulating material and having a cam projection with one face flat and substantially radial, two commutation rings carried by said member with one annular and unbroken and the other extending over said cam projection and there split to provide a gap at the base of said projection, and three contact fingers, one for each ring and bearing against the same, and the third bearing against the surface of said member between the other two, and a conductor strip in the flat face of said cam projection and connected with the unbroken ring and with one end of the split ring and in the path of movement of the middle contact finger when the same drops over said cam projection for momentarily completing the circuit through one of the solenoids and said rings.

5. In a device of the character described, the combination of a web carrying reel, a motor driven spindle loosely engaged with said reel, a clutch mechanism between said spindle and reel, comprising a sleeve slidably and loosely mounted on said spindle, a ratchet wheel fixed to said spindle, a spring pressed pawl on said reel to engage said ratchet wheel to connect said reel to said spindle, said sleeve having a flange, which when the sleeve is moved toward said reel engages under said pawl to lift the same out of engagement with said ratchet wheel to disconnect said reel from said spindle, and web controlled, electrically actuated means to move said sleeve back and forth at predetermined intervals to connect and disconnect said reel to and from said spindle.

6. In a device of the character described, the combination of a web carrying reel, a motor driven spindle loosely engaged with said reel, a clutch mechanism between said spindle and reel, comprising a sleeve slidably and loosely mounted on said spindle, a ratchet wheel fixed to said spindle, a spring pressed pawl on said reel to engage said ratchet wheel to connect said reel to said spindle, said sleeve having a flange, which when the sleeve is moved toward said reel engages under said pawl to lift the same out of engagement with said ratchet wheel to disconnect said reel from said spindle, a pair of solenoids having a common armature connected to said sleeve for moving the same back and forth at predetermined intervals to connect and disconnect said reel to and from said spindle, and web controlled, electrically actuated means in circuit with said solenoids for alternately energizing said solenoids to operate said clutch mechanism.

7. In a device of the character described, the combination of two reels, a web carried thereby, a live spindle loosely engaged with one reel, a motor, a gear train connecting said spindle with said motor for turning said spindle in one direction, a clutch mechanism between said spindle and its associated reel for connecting and disconnecting said reel to and from said spindle, a pair of solenoids having a common armature connected with said clutch mechanism for operating the same, and a make and break mechanism in circuit with said solenoids to alternately energize the same, including a guide roller in said circuit and over which the web moves, a series of slots in said web and elongated transversely thereof and spaced apart lengthwise of the same, a flat spring contact finger bearing against said web at said roller to engage the same through said slots, said finger having the contact end thereof cut to provide a plurality of tongues so that at least one of which will engage the roller through a slot in case the web shifts laterally to bring a slot partially out of complete register with said finger, and another contact finger bearing constantly against said roller beyond one edge of said web.

8. In a device of the character described, the combination of two web carrying reels, a motor connected with said reels by means for turning the reels in opposite directions, a clutch mechanism for each reel for connecting and disconnecting the same to and from said motor, means for operating each clutch mechanism comprising a pair of solenoids, an armature therefor in the form of a rod extending through the solenoids and movable endwise by the same and connected with the clutch mechanism, a sleeve of insulating material fixed in said rod between the solenoids, a contact ring carried by said sleeve a contact member in circuit with said solenoids bearing against said sleeve and in the path of movement of said ring, and a make and break mechanism in said circuit and controlled by the movement of the web to alternately energize said solenoids.

9. In a device of the character described, the combination of two reels, a web carried thereby, a live spindle for each reel, a motor, a gear train connecting the motor with said live spindles for driving the latter in opposite directions, a clutch mechanism for each reel, a clutch connecting solenoid and a clutch disconnecting solenoid for each clutch mechanism, a reversing switch mechanism operated by the gear train and in circuit with the clutch connecting solenoids for placing one of them in the circuit ready to connect its clutch to wind up the web on one reel, the other clutch connecting solenoid being left out of the circuit with its clutch disconnected, another switch mechanism also in said circuit and driven by said gear train for intermittently energizing the clutch connecting solenoid of the web winding reel for connecting its clutch to its live spindle at predetermined intervals, and means controlled by the movement of the web for making and breaking the circuit to the clutch disconnecting solenoid of the winding reel.

10. In a device of the character described, the combination of two reels, a web carried thereby, a live spindle for each reel, a motor, a gear train connecting the motor with said live spindles for driving the latter in opposite directions, a clutch mechanism for each reel, a clutch connecting solenoid and a clutch disconnecting solenoid for each clutch mechanism, a switch mechanism in circuit with the clutch connecting solenoids and driven by said gear train for intermittently energizing the clutch connecting solenoid of the web winding reel for connecting its clutch to its live spindle at predetermined intervals, means controlled by the movement of the web for making and breaking the circuit to the clutch disconnecting solenoid of the winding reel, and another switch mechanism also in said circuit and rotated by the gear train at a rate of speed slower than the first mentioned switch mechanism for energizing the clutch disconnecting solenoid of the other reel for holding the clutch mechanism thereof in position disconnecting that reel from the associated spindle during the winding of the web on the winding reel, and to energize the clutch connecting solenoid of the other reel at predetermined intervals to reverse the direction of the web.

11. In a device of the character described, the combination of two reels, a web carried thereby, a live spindle for each reel, a motor, a gear train connecting the motor with said live spindles for driving the latter in opposite directions, a clutch mechanism for each reel, a clutch connecting solenoid and a clutch disconnecting solenoid for each clutch mechanism, a reversing switch mechanism operated by the gear train and in circuit with the clutch connecting solenoids for placing one of them in the circuit ready to connect its clutch to wind up the web on one reel, the other clutch connecting solenoid being left out of the circuit with its clutch disconnected, another switch mechanism also in said circuit and driven by said gear train for intermittently energizing the clutch connecting solenoid of the web winding reel for connecting its clutch to its live spindle at predetermined intervals, said last named switch mechanism having means to deenergize the clutch disconnecting solenoid used to move the clutch to disengage the winding reel from its spindle immediately after the completion of such movement to permit the clutch connecting solenoid of the other reel when energized to actuate the clutch for connecting the other reel to its spindle to then become the winding reel.

In witness whereof, I hereunto subscribe my name this 17th day of April, 1922.

WELCOME C. MARTIN.